United States Patent
Gangi

(10) Patent No.: US 12,456,942 B2
(45) Date of Patent: Oct. 28, 2025

(54) MOTOR CONTROL SYSTEM

(71) Applicant: TOYOTA JIDOSHA KABUSHIKI KAISHA, Toyota (JP)

(72) Inventor: Suguru Gangi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 158 days.

(21) Appl. No.: 18/407,603

(22) Filed: Jan. 9, 2024

(65) Prior Publication Data

US 2024/0250632 A1 Jul. 25, 2024

(30) Foreign Application Priority Data

Jan. 20, 2023 (JP) .................. 2023-007459

(51) Int. Cl.
| | |
|---|---|
| H02P 23/04 | (2006.01) |
| H02P 6/10 | (2006.01) |
| H02P 27/05 | (2006.01) |
| H02P 29/50 | (2016.01) |

(52) U.S. Cl.
CPC .............. *H02P 29/50* (2016.02); *H02P 27/05* (2013.01)

(58) Field of Classification Search
CPC .. H02P 6/10; H02P 23/04; H02P 29/50; H02P 27/05
USPC ........................................... 318/493
See application file for complete search history.

(56) References Cited

U.S. PATENT DOCUMENTS

| | | | |
|---|---|---|---|
| 11,038,453 B2* | 6/2021 | Taniguchi | H02P 25/22 |
| 2008/0067960 A1* | 3/2008 | Maeda | B62D 5/046 |
| | | | 180/443 |
| 2009/0072777 A1* | 3/2009 | Seguchi | H02P 25/03 |
| | | | 318/718 |
| 2014/0191628 A1* | 7/2014 | Nakano | H02K 1/2746 |
| | | | 310/68 B |
| 2016/0028339 A1* | 1/2016 | Nakai | H02P 21/50 |
| | | | 318/400.02 |
| 2017/0179864 A1* | 6/2017 | Seguchi | H02P 9/14 |
| 2020/0259377 A1* | 8/2020 | Gangi | H02K 1/2766 |
| 2024/0063746 A1* | 2/2024 | Mori | H02P 25/22 |

FOREIGN PATENT DOCUMENTS

JP 2021-040424 A 3/2021

* cited by examiner

*Primary Examiner* — Gabriel Agared
(74) *Attorney, Agent, or Firm* — SoraIP, Inc.

(57) ABSTRACT

A motor control system disclosed herein controls operation of a motor having a stator having one of an armature winding and a field winding and a rotor having the other of the armature winding and the field winding. The motor control system includes a first inverter that supplies an armature current to the armature winding, a second inverter that supplies a field current to the field winding, and a control device that controls the operations of the first inverter and the second inverter. The control device is configured to be capable of executing harmonic superimposition processing for at least partially canceling harmonics appearing in the motor by superimposing harmonic currents on the field current based on the motor operation index indicating the operation of the motor.

5 Claims, 4 Drawing Sheets

MOTOR CONTROL SYSTEM

CROSS-REFERENCE TO RELATED APPLICATION

This application claims priority to Japanese Patent Application No. 2023-007459 filed on Jan. 20, 2023, incorporated herein by reference in its entirety.

BACKGROUND

1. Technical Field

The technology disclosed in the present specification relates to a motor control system.

2. Description of Related Art

Japanese Unexamined Patent Application Publication No. 2021-40424 (JP 2021-40424 A) discloses a motor control system that includes a motor that includes a stator having an armature winding and a rotor having a field winding, and a control device that controls operation of the motor. In the stator, a rotating magnetic field is generated by an armature current (three-phase alternating current) flowing over the armature winding. In the rotor, a direct current magnetic field is generated by a field current (direct current) flowing over the field winding.

SUMMARY

Normally, slots for accommodating armature windings are provided intermittently along a circumferential direction of the stator (or rotor). Accordingly, magnetic flux density of the rotating magnetic field is not uniform along the circumferential direction of the stator (or rotor). Thus, the rotating magnetic field contains oscillating components, also referred to as spatial harmonics. The armature current also contains oscillating components also referred to as temporal harmonics, due to a switching operation at a first inverter. These harmonics could not be canceled out in conventional motor control systems, vibration of the motor occurred sometimes. The present specification provides a technology that is capable of suppressing vibrations of motors.

A motor control system disclosed in the present specification controls operation of a motor that includes
- a stator including one of an armature winding and a field winding, and
- a rotor including another of the armature winding and the field winding.

The motor control system includes
- a first inverter that supplies an armature current to the armature winding,
- a second inverter that supplies a field current to the field winding, and
- a control device that controls operation of the first inverter and the second inverter. The control device is configured to be capable of executing harmonic superimposition processing that at least partially cancels out harmonics appearing in the motor, by superimposing a harmonic current on the field current, based on a motor operation index that indicates the operation of the motor.

Characteristics of the spatial harmonics and the temporal harmonics (e.g., waveforms) are determined from a structure of the motor and motor operation indices (e.g., rotation speed of rotor, and torque command value). The structure of the motor is known, and accordingly the characteristics of the harmonics can be determined once the motor operation indices are known. According to the above configuration, the motor operation indices can be obtained, and thus that the characteristics of the harmonics can be determined. A harmonic current that is capable of at least partially canceling out the harmonics can also be determined based on the characteristics of the harmonics that are determined. Therefore, according to the above configuration, the harmonics appearing in the motor can be at least partially canceled out, and accordingly vibration of the motor can be suppressed.

Note that in the present specification, spatial harmonics and temporal harmonics may be collectively referred to simply as "harmonics".

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In one or more embodiments, the control device may store a waveform table describing waveforms of the harmonic currents to be superimposed on the field currents in association with the motor performance indices.

If the control device is configured to determine the characteristics of the harmonics one by one from the obtained motor performance indices, it takes time to determine the harmonic currents. This can slow down the response speed of the control to harmonics. According to the above configuration, since the waveform table is stored in the control device, the waveform of the high-frequency current to be superimposed is determined relatively immediately in response to obtaining the motor operation index. As a result, it is possible to speed up the control response speed for harmonics.

In one or more embodiments, the control device may perform the harmonic superimposition process when the motor operating index is within a predetermined range. The control device may not perform the harmonic superimposition processing when the motor operation index is not within a predetermined range.

For example, when the output torque of the motor (an example of the motor operation index) is large, it is expected that the device/mechanism that receives the output torque will actively operate. In this case, the device/mechanism may generate relatively large vibrations regardless of the vibrations of the motor. Since the main purpose of suppressing motor vibration is to suppress the vibration of a device or mechanism that operates under the output torque, there is not much significance in suppressing motor vibration when the output torque is large. I can say. That is, it can be said that there is not much significance in executing the harmonic superimposition processing. Considering the energy loss accompanying the superimposition of harmonic currents, it is rather not effective in this case to perform harmonic superimposition processing. According to the above configuration, it is possible to perform classification such that the harmonic superimposition process is not executed when the output torque is large, and the harmonic superimposition process is executed when the output torque is small. Therefore, harmonic superimposition processing can be performed only when it is effective to perform harmonic superimposition processing.

In one or more embodiments, the stator may have the armature winding. The rotor may have the field winding. The armature winding may be a three-phase winding.

In one or more embodiments, the motor operation index may include at least one of a rotation speed of the rotor and a torque command value to the motor.

EXAMPLE

Figure 1:
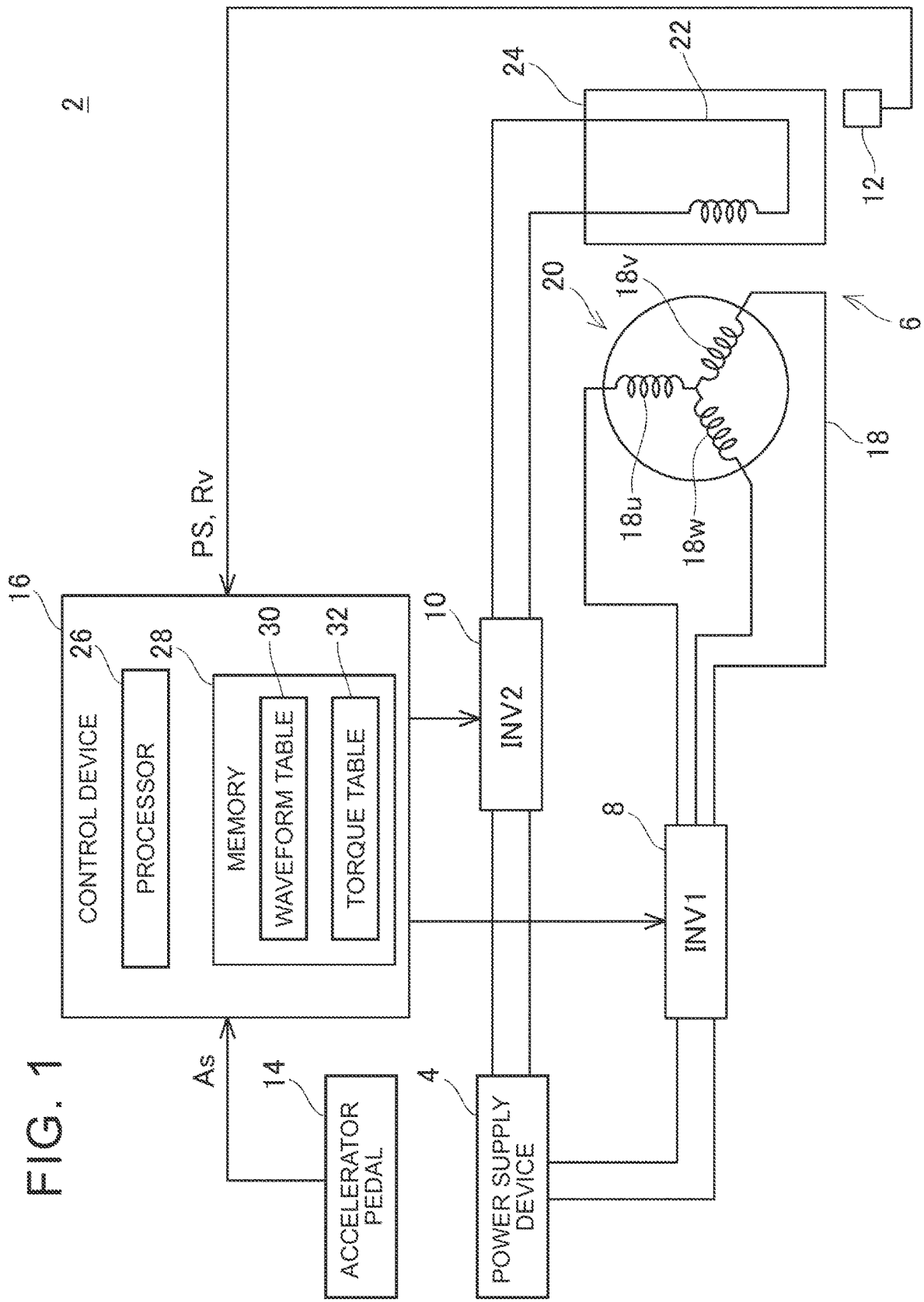
FIG. 1 is a diagram schematically showing a motor control system 2 according to an embodiment.

A motor control system 2 shown in FIG. 1 is mounted on a vehicle (not shown). The motor control system 2 includes a power supply device 4, a motor 6, a first inverter 8, a second inverter 10, a rotation detector 12, an accelerator pedal 14 and a control device 16.

The power supply device 4 is, for example, a battery mounted on a vehicle, and can also be called a DC power supply. The motor 6 comprises a stator 20 with armature windings 18 and a rotor 24 with field windings 22. The armature winding 18 includes a U-phase winding 18$u$, a V-phase winding 18$v$, and a W-phase winding 18$w$. The first inverter 8 electrically connects between the power supply device 4 and the armature winding 18. Second inverter 10 electrically connects power supply device 4 and field winding 22. Although not shown, each of the first inverter 8 and the second inverter 10 has a switching element. Each of the first inverter 8 and the second inverter 10 can convert a direct current supplied from the power supply device 4 into an alternating current by operating a switching element. The rotation detector 12 is a sensor (for example, a resolver) that detects rotation of the rotor 24. The rotation detector 12 inputs a pulse signal Ps indicating the magnetic pole position of the rotor 24 to the control device 16. For example, the rotation speed Rv of the rotor 24 can be determined from the pulse signal Ps. The accelerator pedal 14 is a part for accepting a user's operation. A depression amount As of the accelerator pedal 14 is input to the control device 16.

control device 16 includes processor 26 and memory 28. Various information including a waveform table 30 (details of which will be described later) and a torque table 32 are stored in the memory 28. The torque table 32 describes torque command values Tc to be obtained in association with arbitrary combinations of the rotation speed Rv of the rotor 24 and the depression amount As of the accelerator pedal 14.

Processor 26 controls the operation of each part of motor control system 2 according to a predetermined program stored in memory 28.

Basic Processing Performed by the Processor 26

Figure 2:
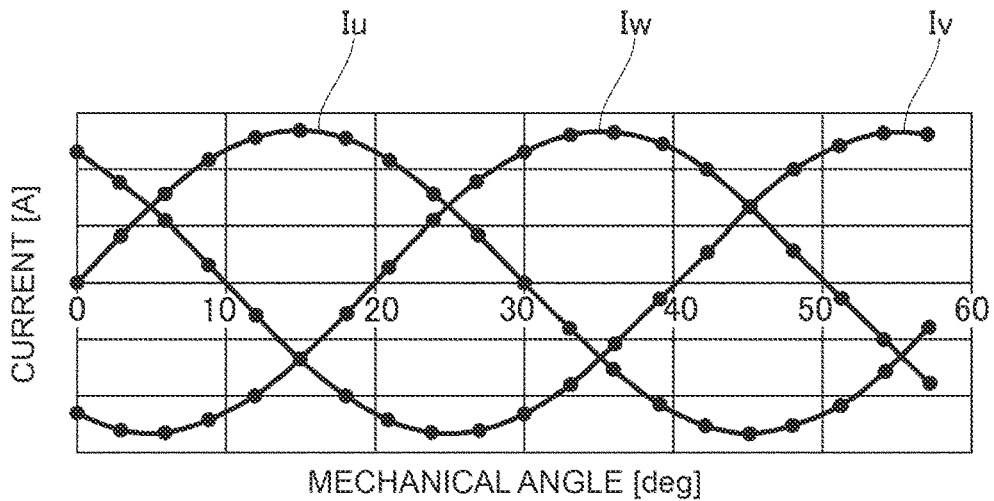
FIG. 2 is a diagram showing waveforms of armature currents Iu, Iv, and Iw flowing through the armature winding 18 in the motor control system 2 according to the embodiment.

The processor 26 supplies armature currents (three-phase alternating current) Iu, Iv, and Iw as shown in FIG. 2 to the armature winding 18 by performing switching control with respect to the first inverter 8. In addition, the processor 26 supplies the field current If to the field winding 22 by conducting between the power supply device 4 and the field winding 22 without performing switching control related to the second inverter 10. At this time, the rotor 24 rotates due to interaction between the rotating magnetic field generated by the armature currents Iu, Iv, and Iw and the magnetic field generated by the field current If. That is, the motor 6 is driven. Also, the processor 26 attempts to cause the output torque To of the motor 6 to follow the torque command value Tc obtained from the torque table 32 by executing PWM control in the first inverter 8, for example.

However, the armature currents Iu, Iv, and Iw contain time harmonics caused by the switching operation of the first inverter 8. Spatial harmonics resulting from the structure of the motor 6 are included in the rotating magnetic field. In the conventional motor control system 2, these harmonics are applied to the output torque To of the motor 6, resulting in the motor 6 vibrating. In order to suppress these phenomena, the processor 26 of the present embodiment executes harmonic superimposition processing, which will be described later.

Figure 3:
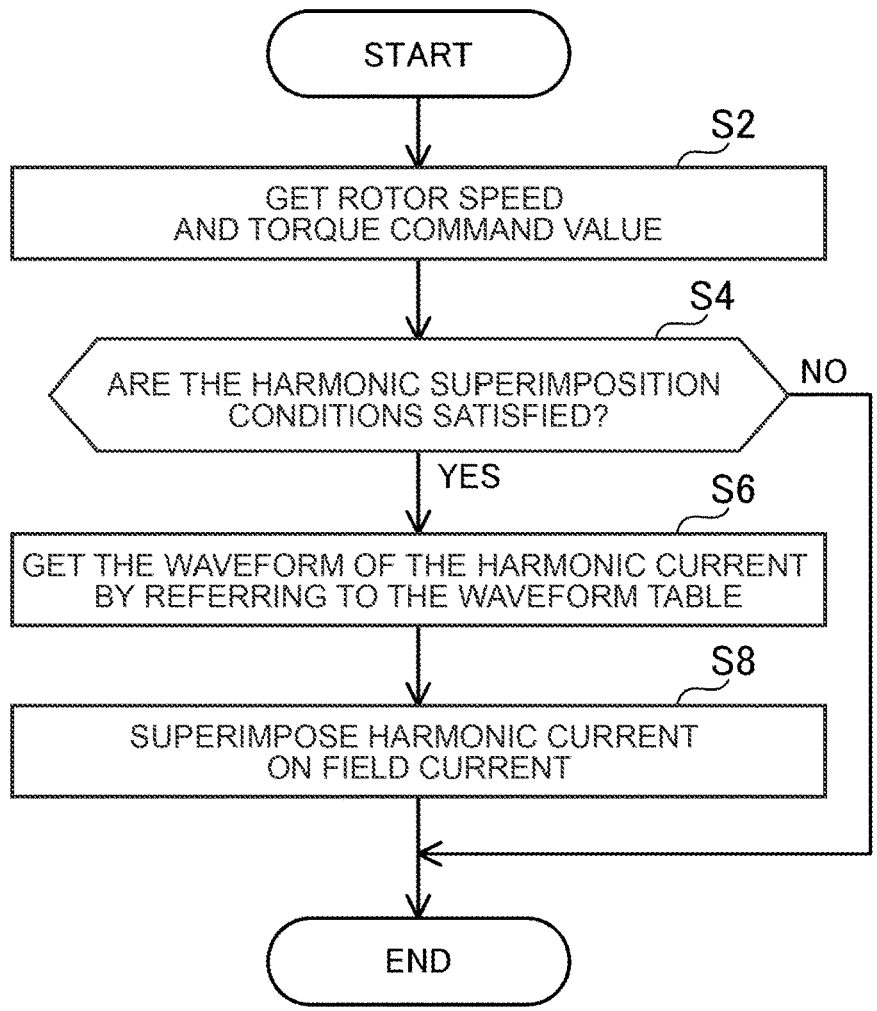
FIG. 3 is a flowchart showing harmonic superimposition processing executed by the processor 26 in the motor control system 2 according to the embodiment.

Harmonic Superimposition Processing; FIG. 3

In S2, processor 26 obtains rotation speed Rv and torque command value Tc. After S2, the process proceeds to S4.

At S4, the processor 26 determines whether or not the harmonic superimposition condition is satisfied. The harmonic superimposition conditions include, for example, the condition that the rotation speed Rv obtained in S2 exceeds a predetermined value and/or the condition that the torque command value Tc obtained in S2 exceeds a predetermined value. If it is determined that the harmonic superimposition condition is not satisfied (NO), the process shown in FIG. 3 ends. If it is determined that the harmonic superimposition condition is satisfied (YES), the process proceeds to S6.

In S6, the processor 26 refers to the waveform table 30 to acquire the waveform of the harmonic current to be superimposed on the field current If. The waveform table 30 describes waveforms of harmonic currents to be superimposed on the field current If in association with arbitrary combinations of the rotation speed Rv and the torque command value Tc. Therefore, in S6, the waveform of the harmonic current associated with the combination of the rotation speed Rv and the torque command value Tc acquired in S2 is acquired. After S6, the process proceeds to S8.

In S8, the processor 26 superimposes the harmonic current of the waveform acquired in S4 on the field current If. Specifically, the processor 26 superimposes the harmonic current on the field current If by performing switching control related to the second inverter 10. After S8, the process shown in FIG. 3 ends.

Effect of Harmonic Superimposition Processing

The operation of the motor 6 when the harmonic superimposition process is not performed and the operation of the motor 6 when the harmonic superimposition process is performed are compared with the rotation speed Rv and the torque command value Tc as constant conditions. Based on the comparison result, the effect of harmonic superimposition processing will be described.

Figure 4:
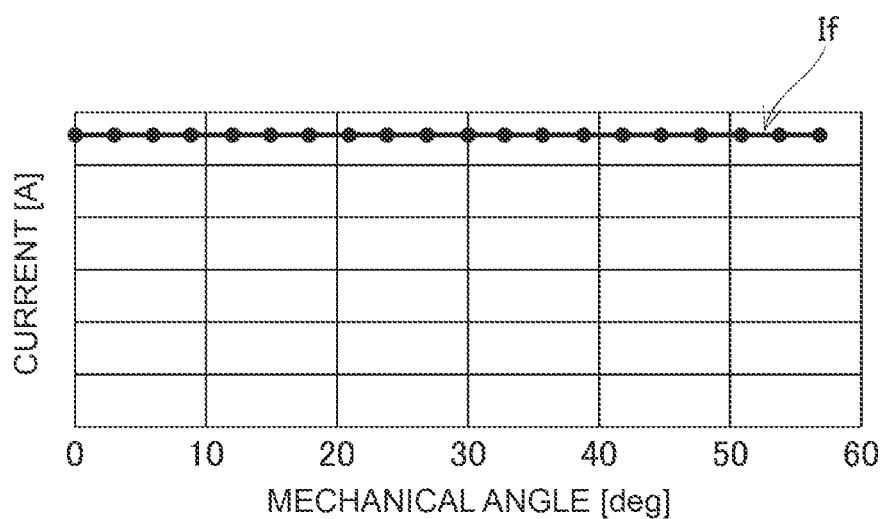
FIG. 4 is a diagram showing respective waveforms of the field current If and the output torque To when the harmonic superimposition processing is not executed in the motor control system 2 according to the embodiment.
Figure 4:
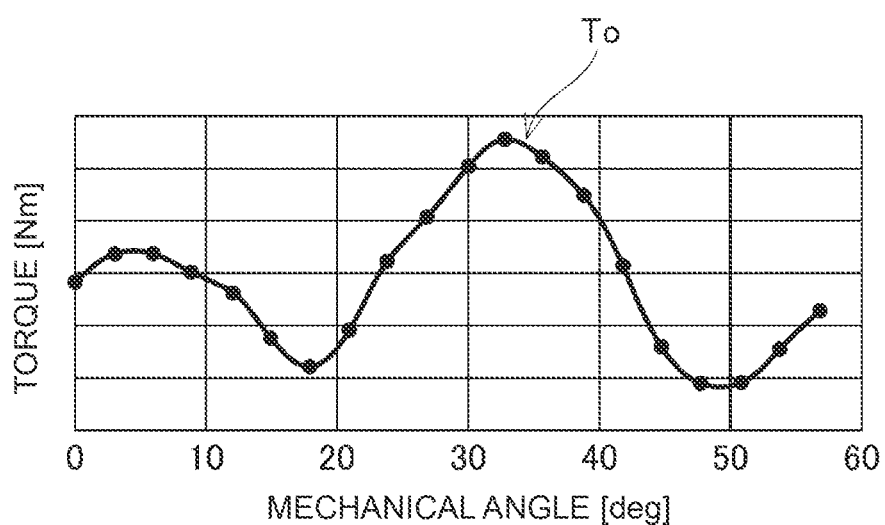

As can be seen from FIG. 4, the field current If is direct current when the harmonic superimposition processing is not performed. In this case, the field current If does not contain an oscillating component that cancels out harmonics. A vibration component caused by harmonics is applied to the output torque To of the motor 6.

Figure 5:
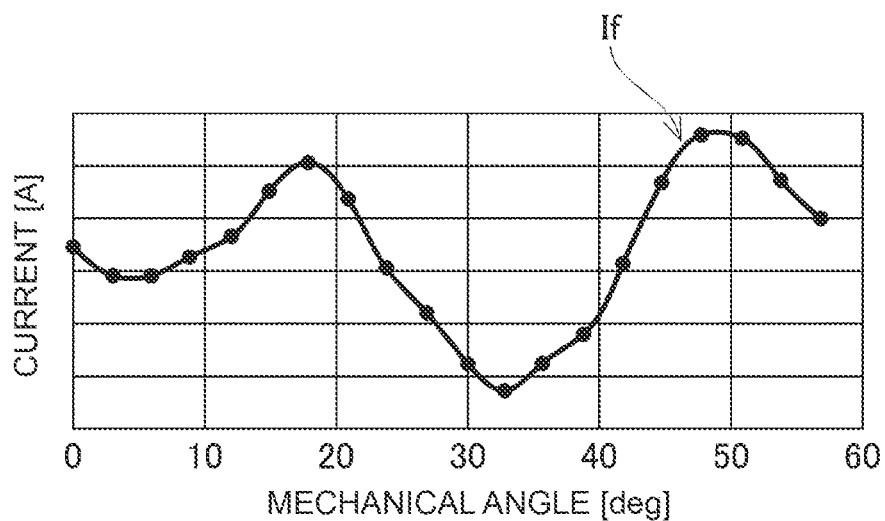
FIG. 5 is a diagram showing respective waveforms of the field current If and the output torque To when harmonic superimposition processing is performed in the motor control system 2 according to the embodiment.
Figure 5:
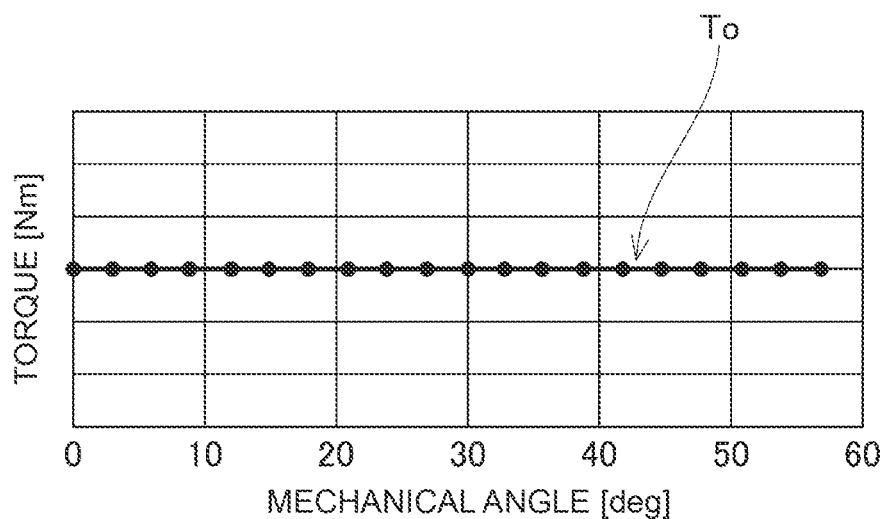

As can be seen from FIG. 5, when the harmonic superimposition process is performed, the field current If is superimposed with the harmonic current. The waveform of the field current If after the harmonic current is superimposed has a shape that is the inverse of the waveform of the harmonic generated at that time (see the lower part of FIG. 4). Since the field current If cancels out the harmonics, the output torque To of the motor 6 is not applied with vibration components caused by the harmonics. Therefore, the vibration of the motor 6 is suppressed by executing the harmonic superimposition process.

Modification

The motor control system 2 may be installed in a device/mechanism other than a vehicle (for example, a work machine).

A stator 20 may have a field winding 22. The rotor 24 may have armature windings 18.

The armature winding 18 may be a two-phase winding or a multi-phase winding of four or more phases.

Torque command value Tc may be determined without depending on rotational speed Rv of rotor 24. For example, instead of the accelerator pedal 14, a device (such as a remote control) that can directly input the torque command value Tc may be provided.

In the harmonic superimposition processing, the processor 26 may perform the processing of S6 after S2 without performing the processing of S4.

The waveform table 30 may describe a switching pattern for superimposing the waveform on the field current If as information indicating the waveform of the harmonic current to be superimposed on the field current If. The processor 26 may perform switching control for the second inverter 10 based on this switching pattern.

The waveform table 30 may describe the waveform of the harmonic current to be superimposed on the field current If in association with one of the rotation speed Rv and the torque command value Tc. That is, the processor 26 may acquire the waveform of the harmonic current to be superimposed on the field current If based on either one of the rotation speed Rv and the torque command value Tc.

Although the specific examples disclosed by the present disclosure have been described in detail above, these are merely examples and do not limit the scope of claims. The techniques described in the claims include various modifications and alterations of the specific examples illustrated above. The technical elements described in this specification or the drawings exhibit technical usefulness alone or in various combinations, and are not limited to the combinations described in the claims as filed. The techniques exemplified in this specification or drawings can achieve a plurality of purposes at the same time, and achieving one of them has technical utility in itself.

What is claimed is:

1. A motor control system for controlling operation of a motor, wherein:
   the motor includes
      a stator including one of an armature winding and a field winding, and
      a rotor including another of the armature winding and the field winding;
   the motor control system includes
      a first inverter that supplies an armature current to the armature winding,
      a second inverter that supplies a field current to the field winding, and
      a control device that controls operation of the first inverter and the second inverter; and
   the control device is configured to execute harmonic superimposition processing that at least partially cancels out harmonics appearing in the motor by superimposing a harmonic current on the field current, based on a motor operation index that indicates the operation of the motor.

2. The motor control system according to claim 1, wherein the control device stores a waveform table in which is described a waveform of the harmonic current to be superimposed on the field current, in association with the motor operation index.

3. The motor control system according to claim 1, wherein the control device executes the harmonic superimposition processing when the motor operation index is within a predetermined range, and does not execute the harmonic superimposition processing when the motor operation index is not within the predetermined range.

4. The motor control system according to claim 1, wherein:
   the stator includes the armature winding;
   the rotor includes the field winding; and
   the armature winding is a three-phase winding.

5. The motor control system according to claim 1, wherein the motor operation index includes at least one of a rotation speed of the rotor and a torque command value to the motor.

* * * * *